A. G. BOYD.
POWER DRILL.
APPLICATION FILED SEPT. 4, 1915.
1,193,981.
Patented Aug. 8, 1916.
2 SHEETS—SHEET 1.
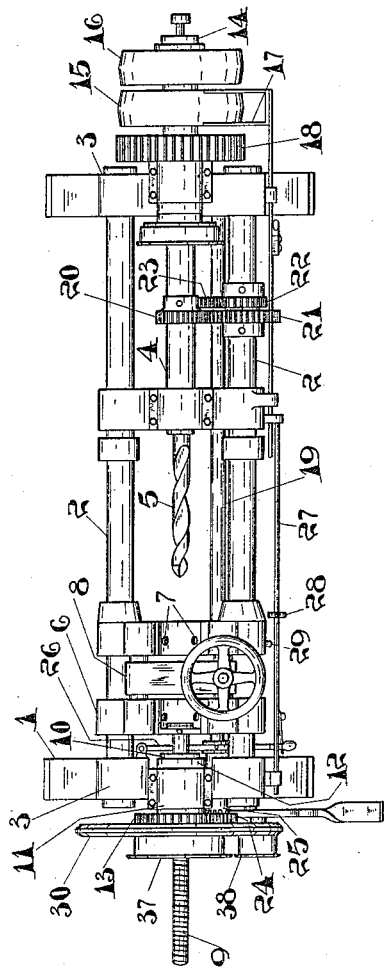
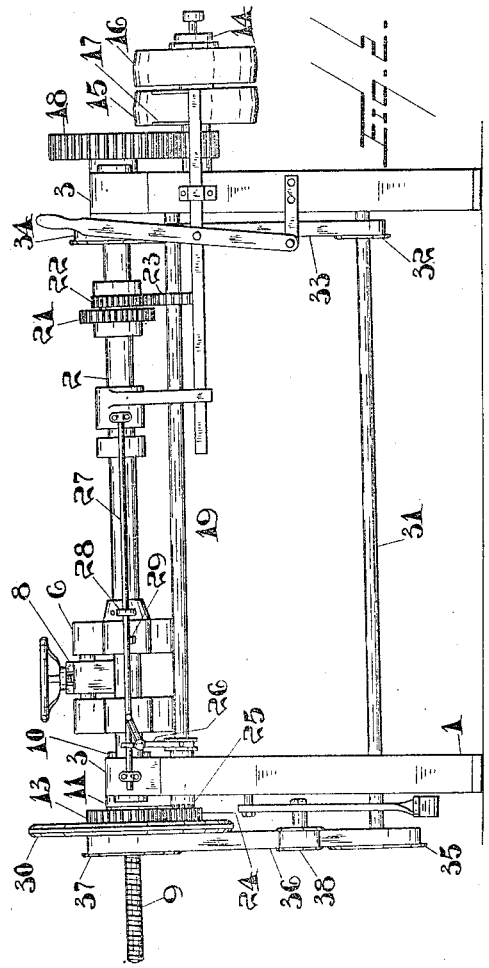
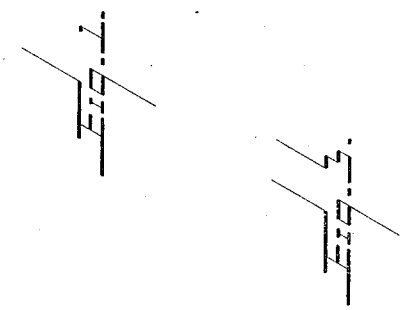
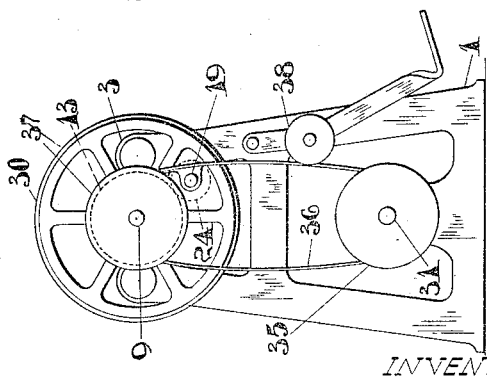
WITNESSES.
N R Tyndall.
E. P. Wall.
INVENTOR.
A. G. Boyd.
BY J. Edward Maybee.
ATTY.

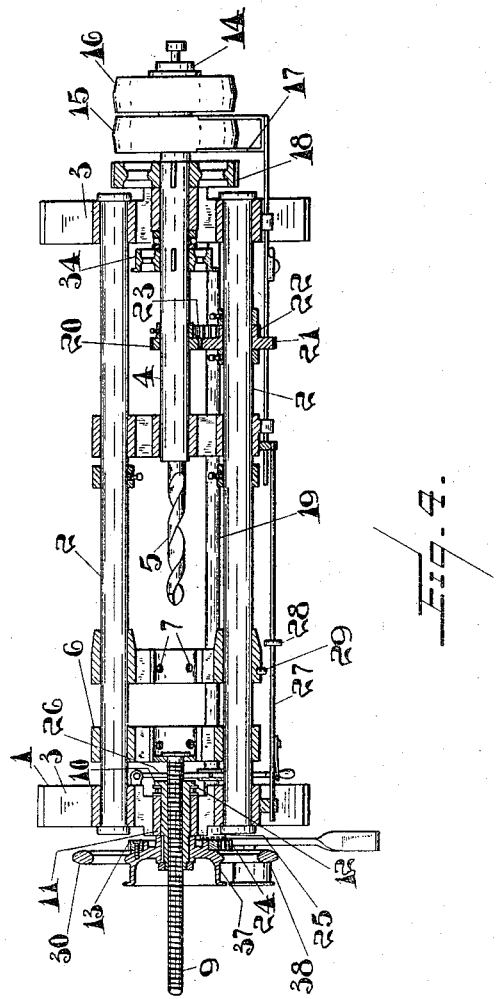

UNITED STATES PATENT OFFICE.

ALEXANDER GRAHAM BOYD, OF TORONTO, ONTARIO, CANADA.

POWER-DRILL.

1,193,981.         Specification of Letters Patent.     Patented Aug. 8, 1916.

Application filed September 4, 1915.   Serial No. 49,109.

*To all whom it may concern:*

Be it known that I, ALEXANDER GRAHAM BOYD, of the city of Toronto, in the county of York, Province of Ontario, Canada, a subject of the King of Great Britain, have made certain new and useful Improvements in Power-Drills, of which the following is a specification.

This invention relates particularly to drills intended mainly for drilling shells and for other work for which a variable feed is not needed. Such work is now generally performed on ordinary vertical drills and much difficulty is experienced in getting rid of the cuttings and in lubricating the work owing to the length of the hole to be drilled. I overcome all difficulties by journaling my drill spindle substantially horizonally but with an inclination of about 2° toward the work holder. The work holder is suitably guided on side bars at each side of the drill spindle and is fed forward by the rotation of a nut driven for forward movement by gearing from a feed shaft geared to the drill spindle and for a rapid return movement by belt drive from the drill spindle through the medium of an intermediate shaft. Clutch mechanism is provided for controlling the feed adapted to be automatically actuated to stop the feed on the completion of the hole.

The invention is hereinafter more specifically described and illustrated in the accompanying drawings in which—

Figure 1 is a plan view of my improved drill; Fig. 2 a side elevation of the same; and Fig. 3 an end elevation. Fig. 4 is a horizontal section taken just above the axis of the drill.

In the drawings like numerals of reference indicate corresponding parts in the different figures of the drawings.

1 is the frame of the apparatus suitably shaped to support the different parts. On the frame are supported the side bars 2 which pass through the transverse members 3 of the frame. On the transverse members 3 is journaled the drill spindle 4 provided with the usual chuck carrying the drill tool 5. On the side bars 2 the work holder carriage 6 is slidable opposite the drill chuck. This work holder is shown as adapted to support an artillery shell. A round recess is formed therein through which the centering screws 7 are threaded. A hinged screw clamp 8 of ordinary construction is provided to clamp a shell in the holder. The work holder carriage is provided with a screw feed arranged as follows: A screw 9 is secured to the carriage and extends through a nut 10 journaled in the bearing 11 on the frame of the machine. The nut is held from longitudinal movement in one direction by the collar 12 and from movement in the other direction by the hub of the gear wheel 13 formed on or secured to the nut.

The drive of the apparatus is arranged as follows: 14 is the main shaft carrying the usual fast-and-loose pulleys 15 and 16 which are provided with the usual belt shifter 17. The drill spindle is driven by the gearing 18 from the main shaft. 19 is the feed shaft which derives its motion from the drill spindle through the medium of the gear wheels 20, 21, 22, and 23, of which 20 is fast on the drill spindle, 21 and 22 secured together and rotating on one of the side bars 2, and the gear 23 on the feed shaft, the other end of the said shaft is geared to the nut by means of the gearing 24.

A clutch 25 is provided by means of which the feed shaft may be disconnected from the gearing to stop the feed. This clutch is actuated by clutch shifter 26 which is connected with a slide rod 27 suitably supported on the frame of the apparatus, provided with an adjustable collar 28 in the path of a tappet 29 on the work carriage. When the work carriage reaches a position it assumes when the hole is bored to the proper depth, the feed is at once automatically stopped.

A fly wheel 30 is preferably provided on the nut 10 to steady its movement.

A quick return of the carriage to its initial position is provided for by the following mechanism: The wheel 30 is used also in effecting a hand feed. An intermediate shaft 31 is journaled on the frame of the machine and is provided with a belt pulley 32 driven by a belt 33 from a belt pulley 34 on the drill spindle. The other end of the intermediate shaft is provided with the belt pulley 35 connected with a belt 36 with a belt pulley 37 on the nut 10. The belt 36 is normally loose and a belt tightener 38 is provided by means of which it can be tightened to cause the rapid rotation of the nut 10 in a reverse direction.

It will be noted that the drill spindle, while substantially horizontal, is inclined from the horizontal at an angle of about 2°. The result of this is that the lubricant squirted into the hole being bored has a tendency to work down the hole and effectively lubricate the point of the drill tool. The cuttings from the tool fall out very freely owing to the substantially horizontal position of the hole, and I find that the rapid clearance of the cuttings, together with the inclination referred to, gives me much better lubrication than is possible with the ordinary vertical type of drill.

From the above description it will be seen that I have devised a drill which will satisfactorily attain the objects of my invention as set out in the preamble to this specification.

What I claim as my invention is:

1. In a power drill the combination of a drill spindle and chuck; side bars parallel to said spindle; a work holder carriage movable on said side bars; a screw extending from said carriage; a nut through which said screw is threaded; means for holding said nut from movement longitudinally of the apparatus; and a feed shaft geared to said nut and to the drill spindle.

2. In a power drill the combination of a drill spindle and chuck; side bars parallel to said spindle; a work holder carriage movable on said side bars; a screw extending from said carriage; a nut through which said screw is threaded; means for holding said nut from movement longitudinally of the apparatus; a feed shaft geared to said nut and to the drill spindle; a clutch controlling the feed drive; a clutch shifter; and a tappet on the work holder carriage for shifting the clutch to stop the feed drive.

3. In a power drill the combination of a drill spindle and chuck; side bars parallel to said spindle; a work holder carriage movable on said side bars; a screw extending from said carriage; a nut through which said screw is threaded; means for holding said nut from movement longitudinally of the apparatus; a feed shaft geared to said nut and to the drill spindle; a belt pulley on the feed spindle; an intermediate shaft; a belt pulley thereon; a belt connecting said pulleys; a second pulley on the intermediate shaft; a pulley on the aforesaid nut; a belt connecting said pulleys; and a belt tightener, one of said belts being normally loose and adapted to be tightened by said belt tightener.

Signed at Toronto this 31st day of Aug., A. D. 1915, in the presence of the two undersigned witnesses.

ALEXANDER GRAHAM BOYD.

Witnesses:
J. EDW. MAYBEE,
E. P. HALL.